US010351145B2

United States Patent
Izraeli et al.

(10) Patent No.: US 10,351,145 B2
(45) Date of Patent: Jul. 16, 2019

(54) METHOD AND SYSTEM FOR EVALUATING A QUALITY OF DRIVING

(71) Applicant: Traffilog LTD., Rosh-Haayin (IL)

(72) Inventors: Robert Izraeli, Holon (IL); Assi Bitton, Herzelia (IL); Arik Greenberger, Binyamina (IL)

(73) Assignee: TRAFFILOG LTD, Rosh Ha'ayin (IL)

(*) Notice: Subject to any disclaimer, the term of this patent is extended or adjusted under 35 U.S.C. 154(b) by 146 days.

(21) Appl. No.: 15/091,599

(22) Filed: Apr. 6, 2016

(65) Prior Publication Data

US 2017/0291612 A1    Oct. 12, 2017

(51) Int. Cl.
*B60W 40/105*    (2012.01)
*B60W 40/10*    (2012.01)
*G07C 5/00*    (2006.01)

(52) U.S. Cl.
CPC .......... *B60W 40/105* (2013.01); *B60W 40/10* (2013.01); *G07C 5/006* (2013.01); *B60W 2520/10* (2013.01); *B60W 2520/16* (2013.01); *B60W 2720/00* (2013.01)

(58) Field of Classification Search
CPC .......... B60W 40/105; B60W 2520/10; B60W 2720/00
USPC ........................................................ 701/29.1
See application file for complete search history.

(56) References Cited

U.S. PATENT DOCUMENTS

| 4,883,469 | A | * | 11/1989 | Glazier | A61M 5/3216 604/192 |
|---|---|---|---|---|---|
| 5,536,059 | A | * | 7/1996 | Amirouche | B60N 2/501 188/266.1 |
| 6,529,838 | B1 | * | 3/2003 | Horiuchi | G01H 3/08 381/71.4 |
| 6,691,002 | B2 | * | 2/2004 | Dormegnie | G01H 3/08 701/1 |
| 7,454,964 | B2 | * | 11/2008 | Flament | G01M 17/0072 73/146 |
| 7,487,679 | B2 | * | 2/2009 | Sirrine | G01H 1/003 702/39 |
| 7,813,822 | B1 | * | 10/2010 | Hoffberg | G06K 9/00369 381/73.1 |
| 8,630,768 | B2 | * | 1/2014 | McClellan | G01S 5/0027 701/36 |
| 8,825,267 | B2 | * | 9/2014 | Gerdin | B60C 23/061 340/438 |
| 2010/0211249 | A1 | * | 8/2010 | McClellan | G07C 5/006 701/31.4 |
| 2010/0305779 | A1 | * | 12/2010 | Hassan | G01C 17/38 701/2 |

(Continued)

*Primary Examiner* — Anne M Antonucci
*Assistant Examiner* — James E Stroud
(74) *Attorney, Agent, or Firm* — Reches Patents (57) ABSTRACT

A method for monitoring a vehicle, the method may include measuring a speed of the vehicle to provide speed measurements; measuring, by at least one vibration sensor, vibrations of the vehicle to provide vibrations measurements; determining, based on the vibration measurements and speed measurements, an actual relationship between speed and vibrations of the vehicle; comparing between the actual relationship between the speed and vibrations of the vehicle and a reference relationship between speed and vibrations of the vehicle to provide a comparison result; and determining the quality of the driving based on the comparison result.

3 Claims, 9 Drawing Sheets

(56) References Cited

U.S. PATENT DOCUMENTS

2015/0009485 A1* 1/2015 Mheen .................... G01S 17/87
356/4.01
2016/0117928 A1* 4/2016 Hodges ................. G07C 5/008
701/99

* cited by examiner

METHOD AND SYSTEM FOR EVALUATING A QUALITY OF DRIVING

BACKGROUND

Vehicles such as cars, vans, minivans, trucks, SUV and motorcycles are prone to failures. The amount of the failures and the severity of the failures may be partially attributed to the manner in which the vehicles are used. A vehicle that is driven according to the road conditions is expected to be in a better shape than a vehicle that is driven in reckless manner.

There is a growing need to evaluate the quality of driving a vehicle.

SUMMARY

According to an embodiment of the invention various methods may be provided and are described in the specification.

According to various embodiments of the invention there may be provided a non-transitory computer readable medium that may store instructions for performing any of the methods described in the specification and any steps thereof, including any combinations of same.

Additional embodiments of the invention include a system arranged to execute any or all of the methods described in the specification above, including any stages- and any combinations of same.

According to an embodiment of the invention there may be provided a computerized system that comprises a memory unit and a processor; wherein the memory unit is configured to (a) store vibrations measurements provided by at least one vibration sensor that is installed in a vehicle; (b) store speed measurements indicative of a speed of the vehicle; and wherein the processor is configured to (a) determine, based on the vibration measurements and speed measurements, an actual relationship between speed and vibrations of the vehicle; (b) compare between the actual relationship between the speed and vibrations of the vehicle and a reference relationship between speed and vibrations of the vehicle to provide a comparison result; and determine a quality of the driving based on the comparison result.

According to an embodiment of the invention there may be provided a non-transitory computer readable medium that stores instructions that once executed by a vehicle monitor, cause the vehicle monitor to execute the steps of: measuring a speed of the vehicle to provide speed measurements; measuring, by at least one vibration sensor, vibrations of the vehicle to provide vibrations measurements; determining, based on the vibration measurements and speed measurements, an actual relationship between speed and vibrations of the vehicle; comparing between the actual relationship between the speed and vibrations of the vehicle and a reference relationship between speed and vibrations of the vehicle to provide a comparison result; and determining the quality of the driving based on the comparison result.

According to an embodiment of the invention there may be provided a method for monitoring a vehicle, the method may include: measuring a speed of the vehicle to provide speed measurements; measuring, by at least one vibration sensor, vibrations of the vehicle to provide vibrations measurements; determining, based on the vibration measurements and speed measurements, an actual relationship between speed and vibrations of the vehicle; comparing between the actual relationship between the speed and vibrations of the vehicle and a reference relationship between speed and vibrations of the vehicle to provide a comparison result; and determining the quality of the driving based on the comparison result.

The computerized system may be configured to, and/or the non-transitory computer readable medium may store instructions for and/or the method may include repeating, for each time window of multiple time windows the steps of: measuring, during the time window, the speed of the vehicle to provide speed measurements related to the time window; measuring, during the time window, vibrations of the vehicle to provide vibrations measurements related to the time window; determining, based on the vibration measurements related to the time window and the speed measurements related to the time window, an actual relationship between speed and vibrations of the vehicle related to the time window; comparing between the actual relationship between the speed and vibrations of the vehicle related to the time window and a reference relationship between speed and vibrations of the vehicle to provide a comparison result related to the time window; and determining a quality of the driving during the time window based on the comparison result related to the time window.

The computerized system may be configured to, and/or the non-transitory computer readable medium may store instructions for and/or the method may include updating the reference relationship based on actual relationships evaluated during one or more multiple time windows of the multiple time windows.

The computerized system may be configured to, and/or the non-transitory computer readable medium may store instructions for and/or the method may include receiving information about actual relationships that are related to multiple vehicles; and updating the reference relationship based on the information about actual relationships that are related to multiple vehicles.

The computerized system may be configured to, and/or the non-transitory computer readable medium may store instructions for and/or the method may include transmitting to a computerized system located outside the vehicle information about actual relationships evaluated during one or more multiple time windows of the multiple time windows.

The computerized system may be configured to, and/or the non-transitory computer readable medium may store instructions for and/or the method may include receiving from a computerized system located outside the vehicle an update to the reference relationship between speed and vibrations of the vehicle; and updating the reference relationship between speed and vibrations of the vehicle.

The at least one vibration sensor may include multiple vibration sensors.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Figure 1:
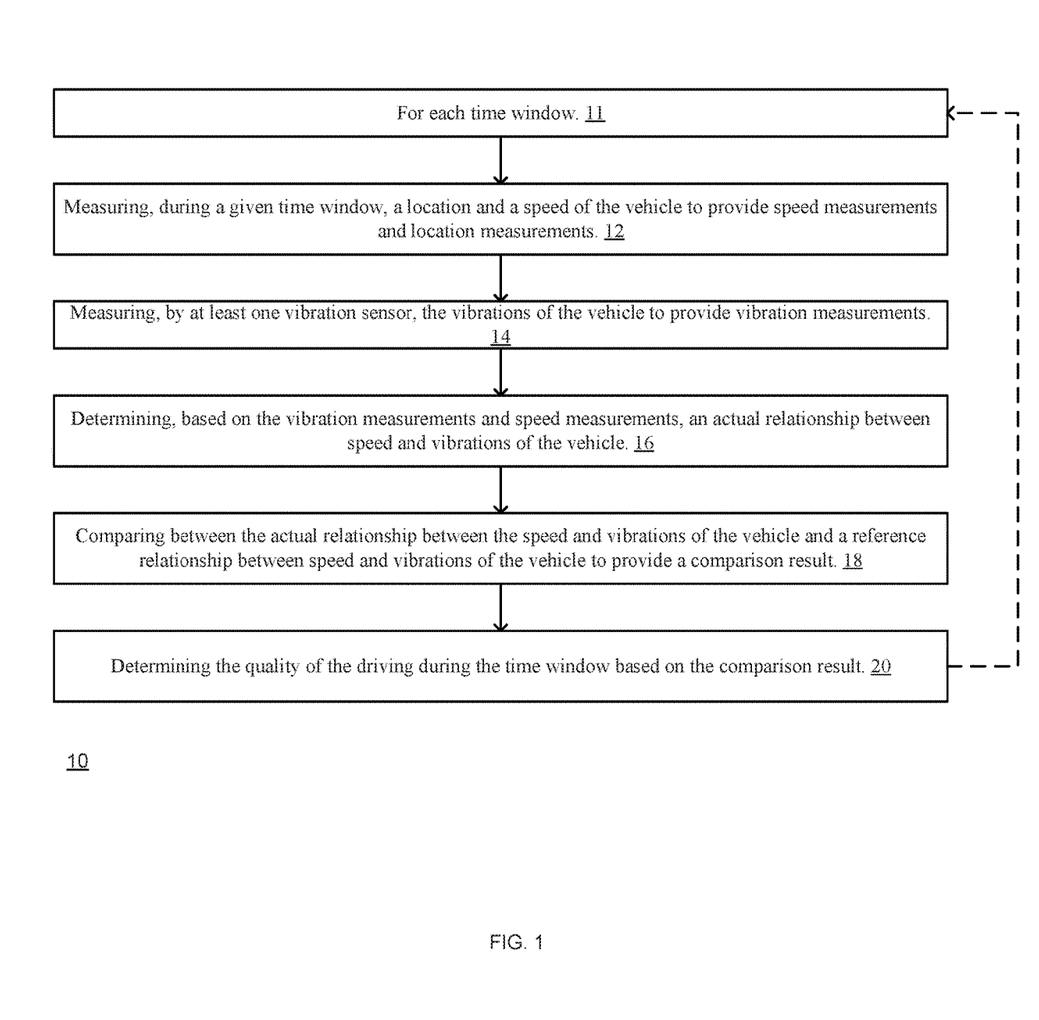
FIG. 1 illustrates a method according to an embodiment of the invention.

FIG. 1 illustrates method 10 according to an embodiment of the invention.

Method 10 may be executed during multiple time windows.

A time window may last a fraction of a second, one or more seconds, one or more minutes, and the like.

For each time window out of the multiple time window (see step 11 denoted "for each time window"), the method executes steps 12 and 14.

Step 12 includes measuring, during a given time window, a location and a speed of the vehicle. The speed may be measured by a speed sensor installed in the vehicle or by a speed sensor located outside the vehicle. The outcome of step 12 is speed measurements and location measurements.

The speed of the vehicle may be calculated in response to timing information (such as time stamps) associated with locations of the vehicle.

The location of the vehicle may be measured by a location sensor installed in the vehicle or by a location sensor located outside the vehicle. The location sensor may be a Global Positioning System (GPS) sensor and/or may be a triangulation-based location sensor that measures the location of the vehicle based on wireless transmissions emitted from the vehicle.

According to an embodiment of the invention, step 12 includes only measuring the speed of the vehicle and not measuring the location of the vehicle.

Step 14 may include measuring, by at least one vibration sensor, the vibrations of the vehicle.

The vibration sensor may be, for example, an accelerometer that may measure the acceleration of a vehicle along axes that are oriented in relation to each other. The axes may be, for example, perpendicular to each other (as in the case of X-axis, Y-axis and Z-axis) but they may be oriented to each other by other angles.

The acceleration measured in step 14 should reflect the vibrations—such as accelerations that are normal to the longitudinal axis of the vehicle or at least substantially oriented to the longitudinal axis of the vehicle. The vibrations may also include acceleration components that are parallel to the longitudinal axis of the vehicle and/or non-substantially oriented in relation to the longitudinal axis of the vehicle.

It will be assumed, for example, that each vibration sensor is a three axis accelerometer that is installed in the vehicle.

A vibration sensor may be positioned at a position that preceded the suspension of the vehicle, may be positioned at a position that follows the suspension of the vehicle, may be included in the suspension of the vehicle and/or may monitor one or more parts of the vehicle (such as but not limited to a shock absorber, a spring and the like).

The outcome of step 14 is vibration measurements. There may be multiple vibration measurements per time window.

The vibration measurements may be acquired at a rate that may be 10 measurements per second, below 10 measurements per seconds or above 10 measurements per second. Higher rates may provide a more accurate monitoring of the vehicle. The rate of the vibration measurements may be constant or may vary over time.

For example—the vibration measurements rate may exceed when sensing that the vehicle is about to cross (or is crossing) a bump, a hole, or a problematic road segment. The sensing of the crossing may be based upon vibration measurements. For example—an above threshold value of acceleration along one or more axis may trigger an increment in the rate of vibration measurements. Another sensor such as a radar or a camera of the vehicle may generate an alert of a proximate obstacle and the alert may change the rate of vibration measurements. The presence of a close obstacle may be inferred from the location of the vehicle and the locations of known obstacles.

The vibrations can be measured at any given accuracy level. Higher accuracy levels provide more information but may require more costly vibration sensors. For example—the accuracy of the vibration sensor may be one milli-Gal. Other values may be used.

Steps 12 and 14 may be followed by step 16 of determining, based on the vibration measurements and speed measurements, an actual relationship between speed and vibrations of the vehicle.

Step 16 may be followed by step 18 comparing between the actual relationship between the speed and vibrations of the vehicle and a reference relationship between speed and vibrations of the vehicle to provide a comparison result.

Step 18 may be followed by step 20 of determining the quality of the driving during the time window based on the comparison result.

Steps 18 and 20 may be merged in the sense that the comparison result may be the indication of the quality of driving.

Step 20 may be followed by step 11 and steps 12, 14, 16, 18 and 20 may be repeated for another time window.

It is noted that the quality of driving related to a certain time window may be calculated only per the comparison result related to that certain time window.

Alternatively, a quality of driving related to a certain time window may take into account comparison results related to one or more previous time windows. For example—the quality of driving of a certain time window may be a sum or a weighted sum or any other function that assigns different weights or the same weights to comparison results obtained during multiple time windows. Yet for another example—the quality of driving of a certain time window may reflect differences (or any other type of relationship) between comparison results of different time windows.

According to an embodiment of the invention the quality of driving related to a certain time window may be calculated based on quality of driving values related to one or more previous time windows. For example—the quality of driving of a certain time window may be a sum or a weighted sum (or any other function) that assigns different weights (or the same weights) to quality of driving values obtained during multiple time windows. Yet for another example—the quality of driving of a certain time window may reflect differences (or any other type of relationship) between quality of driving values of different time windows.

The reference relationship between speed and vibrations of the vehicle may represent a desired relationship between the speed of the vehicle and the vibrations of the vehicle. The reference relationship may represent an optimal adaptation of the driving of the vehicle to the road conditions or a sub-optimal adaptation between the driving of the vehicle to the road conditions.

The reference relationship may be tailored to the vehicle model and/or year of manufacturing, to the location of the accelerometer in relation to the suspension of the vehicle, may be responsive to the location of the vehicle (which may represent that conditions of the road at a certain location), may be calculated and/or updated based on measurements of speed and vibrations of multiple vehicles during one or more time periods, and the like.

According to an embodiment of the invention the reference relationship may be represented by an equation (for example—a polynomial or any other type of equation) or by a mapping between different speed values and different vibration values.

The actual relationship between the speed and vibrations of the vehicle may be, for a time window, be represented by a point in a speed versus vibration plane.

The comparison may include calculating a difference between the reference relationship and the actual relationship between the speed and vibrations of the vehicle.

Larger distances may represent lower quality of driving.

Additionally or alternatively, distances that represent excess speed (speed above the recommended speed) may be associated with lower quality values than actual speeds that represent speeds below the recommended speed.

There may be a liner or non-linear relationship between the distance and the quality of driving. The range of distances may be segments to segments and each segment may be associated with a quality value.

Yet according to an embodiment of the invention the evaluation of the quality of driving may also take into account the allowed speed at the location of the vehicle. For example, driving at a speed that is above the allowed speed may be penalized regardless of the vibrations of the vehicle.

Yet according to an embodiment of the invention the evaluation of the quality of driving may take into account additional factors such as ambient conditions (weather) and/or time and date of the driving (driving during the peak of winter, during the summer, during the day, driving during the night).

Yet according to an embodiment of the invention the evaluation of the quality of driving may take into account the history of the driver and/or the history of the road segment on which the vehicle is driving. For example—deviations from the reference relationship may be penalized more harshly in road segments in which many accidents occurred.

Step 20 may include taking into account any combination of allowed speed, ambient conditions, time and/or date of driving, the history of the driver and/or the history of the road segments.

Each one of steps 16, 18 and 20 may be executed by a computer that is installed in the vehicle or by a computer that is installed outside the vehicle. Some steps of 16, 18 and 20 may be executed by a computer that is installed in the vehicle while other steps of 16, 18 and 20 may be executed by a computer that is installed outside the vehicle.

Step 14 may be executed by a vibration sensor that is installed in the vehicle or by a vibration sensor installed outside the vehicle.

Step 12 may be executed in part by a speed sensor that is installed in the vehicle or by a speed sensor that is located outside the vehicle. Step 12 may be executed in part by a location sensor that is installed in the vehicle or by a location sensor that is located outside the vehicle.

Each one of steps 12 and 14 may be executed by a sensor that is installed in the vehicle or by a computer that is installed outside the vehicle. Some steps of 16, 18 and 20 may be executed by a computer that is installed in the vehicle while other steps of 16, 18 and 20 may be executed by a computer that is installed outside the vehicle.

Figure 2:
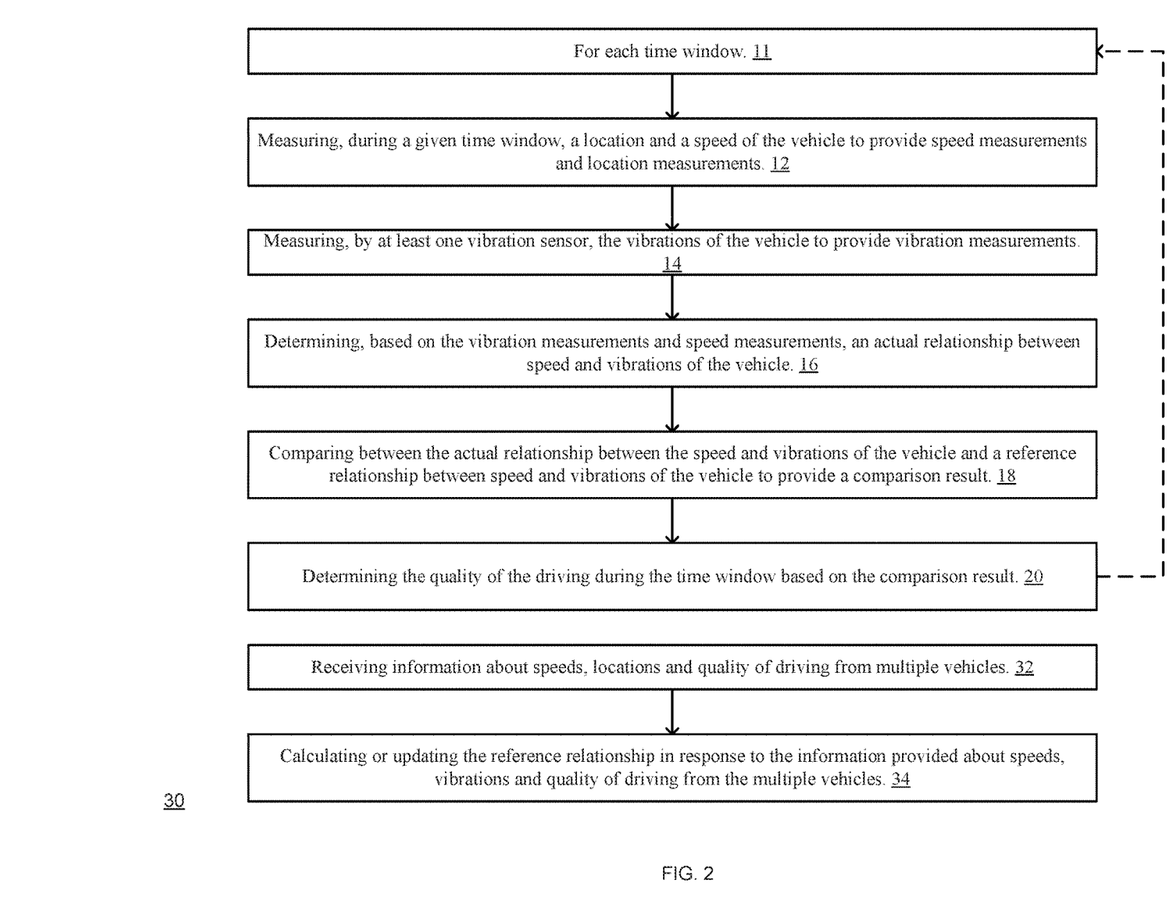
FIG. 2 illustrates a method according to an embodiment of the invention.

FIG. 2 illustrates method 30 according to an embodiment of the invention.

Method 30 differs from method 10 by including steps 32 and 34.

Step 32 may include receiving information about speeds, locations and quality of driving from multiple vehicles. The information may be received over short and/or long periods of time. For example—the information may be received over days, weeks, months and even years.

Step 32 may be receiving the information by a computer located in a certain vehicle and/or by a computer located outside any vehicle. The information may be sent over one or more communication network, relayed between vehicles and the like.

Step 32 may be followed by step 34 of calculating or updating the reference relationship in response to the information provided about speeds, vibrations and quality of driving from the multiple vehicles.

It is noted that step 32 may also include information about the vehicle—such as the manufacturer of the vehicle, the model of the vehicle, the year of manufacturing the vehicle, and the like. The reference relationship may be set per manufacturer, per vehicle model and/or per year of the manufacturing of the vehicle.

Figure 3:
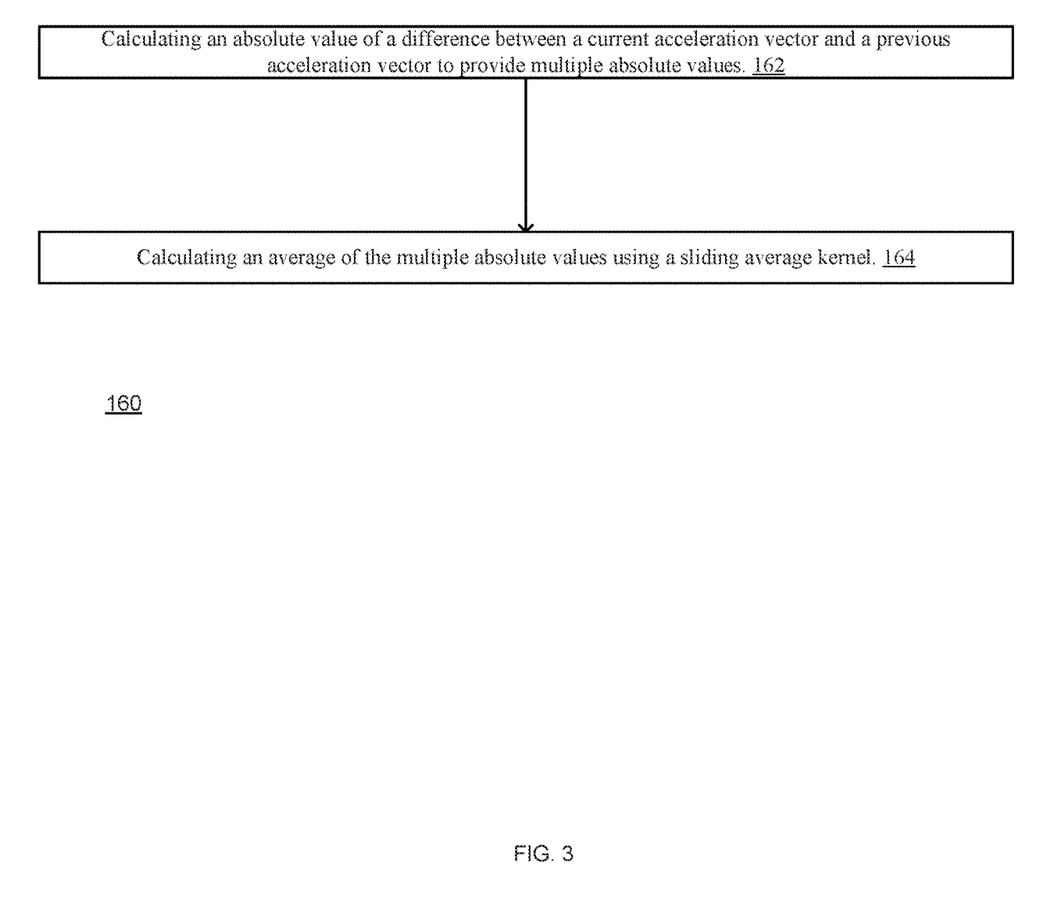
FIG. 3 illustrates a step of the method of FIG. 1 according to an embodiment of the invention.

FIG. 3 illustrates step 16 of method 10 of FIG. 1 according to an embodiment of the invention.

It is assumed that the vibrations measurements of step 14 are acceleration vectors.

For example—each 0.1 second a three axis accelerometer measures an acceleration vectors that includes X-axis acceleration, Y-axis acceleration and Z-axis acceleration.

Step 16 may include processing the acceleration vectors.

For example, step 16 may include step 162 of calculating an absolute value of a difference between a current acceleration vector and a previous acceleration vector. The difference may be for example, a square of a sum of (a) a difference between the current X-axis acceleration and the previous X-axis acceleration, (b) a difference between the current Y-axis acceleration and the previous Y-axis acceleration, and (c) a difference between the current Z-axis acceleration and the previous Z-axis acceleration.

Step 162 may provide multiple absolute values. The number of absolute values may equal the length of the time window multiplied by the rate of vibration measurements. For example, if the time window is 1 minute long and the rate of vibration is 10 measurements per second then there are 600 vibration measurements per time window and there are about 600 absolute values.

Step 162 may be followed by processing multiple absolute values. For example, step 162 may be followed by step 164 of calculating an average of the multiple absolute values using a sliding average kernel. Longer kernels will be responsive to more absolute values.

Step 18 may include calculating the distance between the average of the multiple absolute values and the reference relationship.

Figure 4:
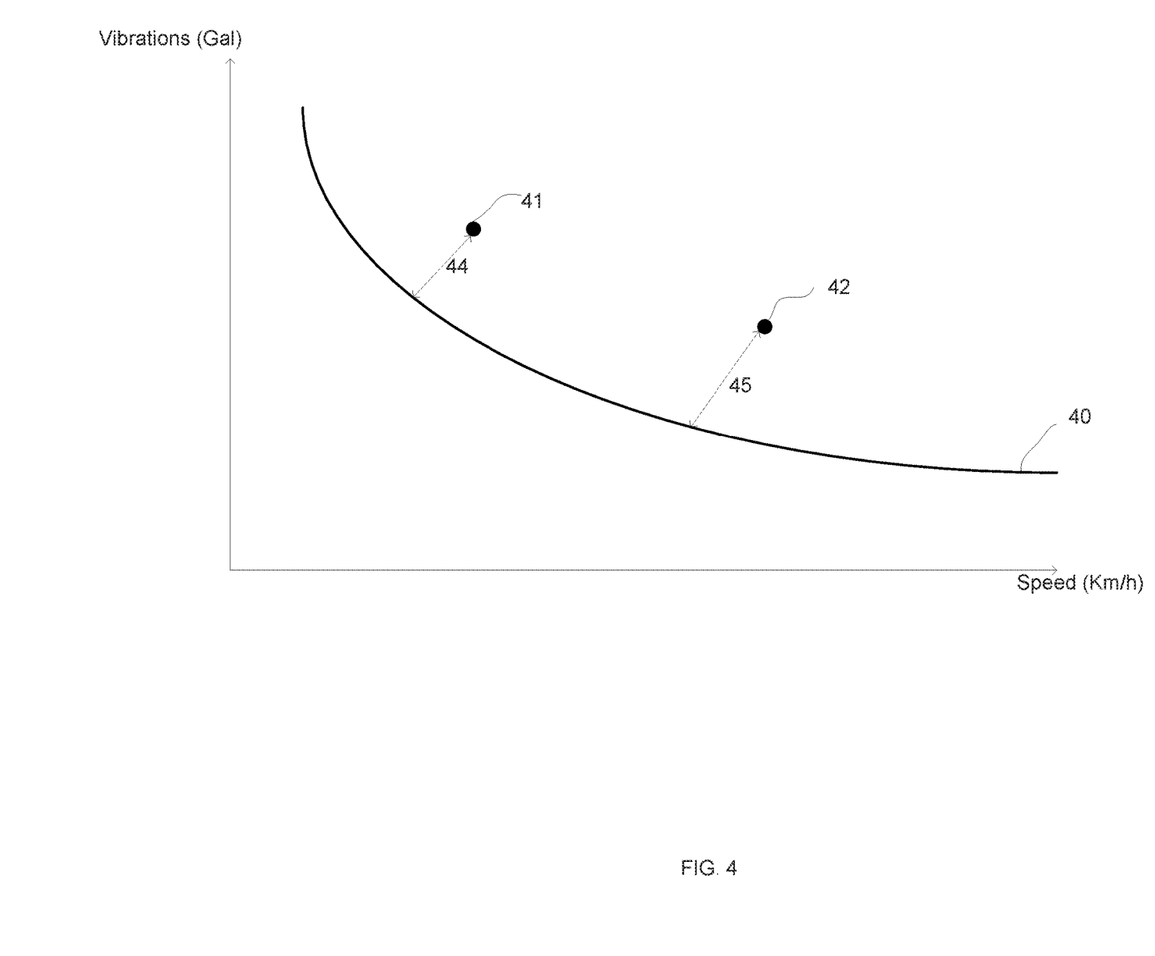
FIG. 4 illustrates a vibrations speed plane according to an embodiment of the invention.

FIG. 4 illustrates a vibrations-to-speed plane according to an embodiment of the invention.

In FIG. 4 the X-axis represents vibrations and the Y-axis represents speed. Curve 40 represents a reference relationship between vibrations and speed, dots 41 and 42 represent the actual relationships between vibrations and speed at two different points of time.

Distances 44 and 45 are the distances between dots 41 and 42 and curve 40 respectively.

Figure 5:
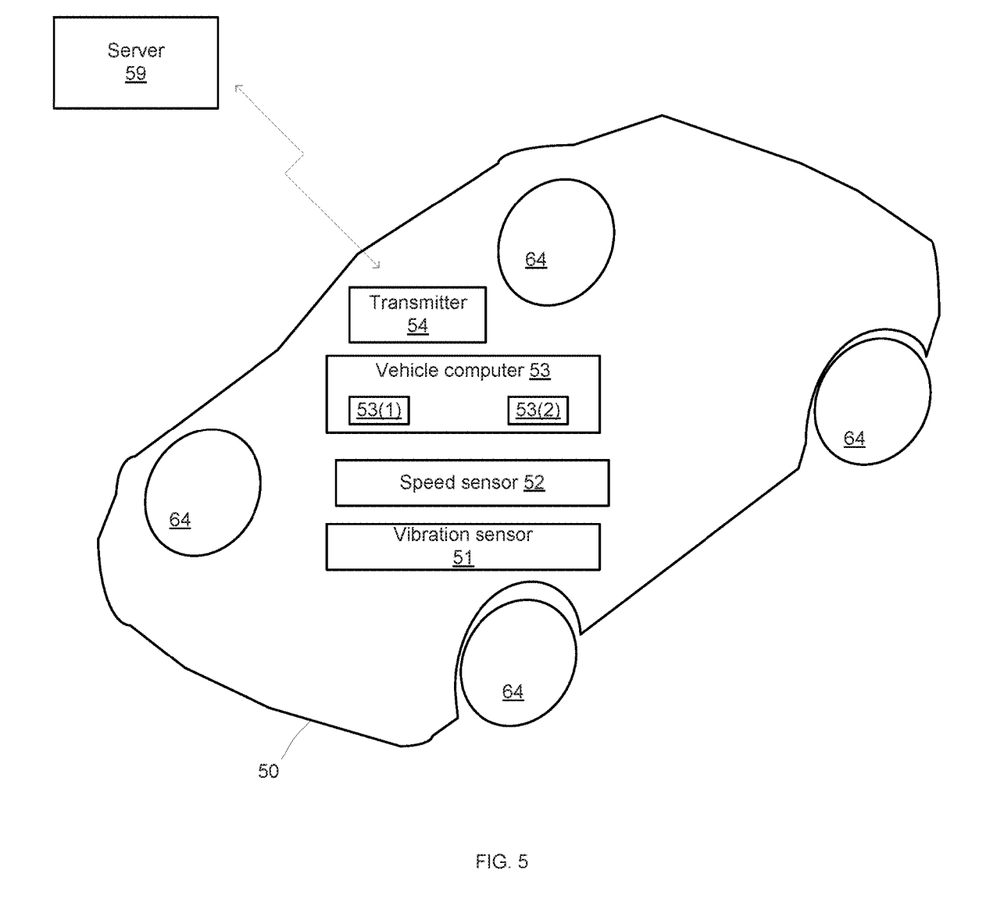
FIG. 5 illustrates a vehicle and a server according to an embodiment of the invention.

FIG. 5 illustrates vehicle 50, wheels 64, vibration sensor 51, speed sensor 52, vehicle computer 53, transmitter 54 that are located within vehicle 50 and a server 59 located outside the vehicle 50, according to an embodiment of the invention.

Vehicle computer 53 may execute steps 16, 18 and 20 and the server 59 may execute steps 32 and 34.

Figure 9:
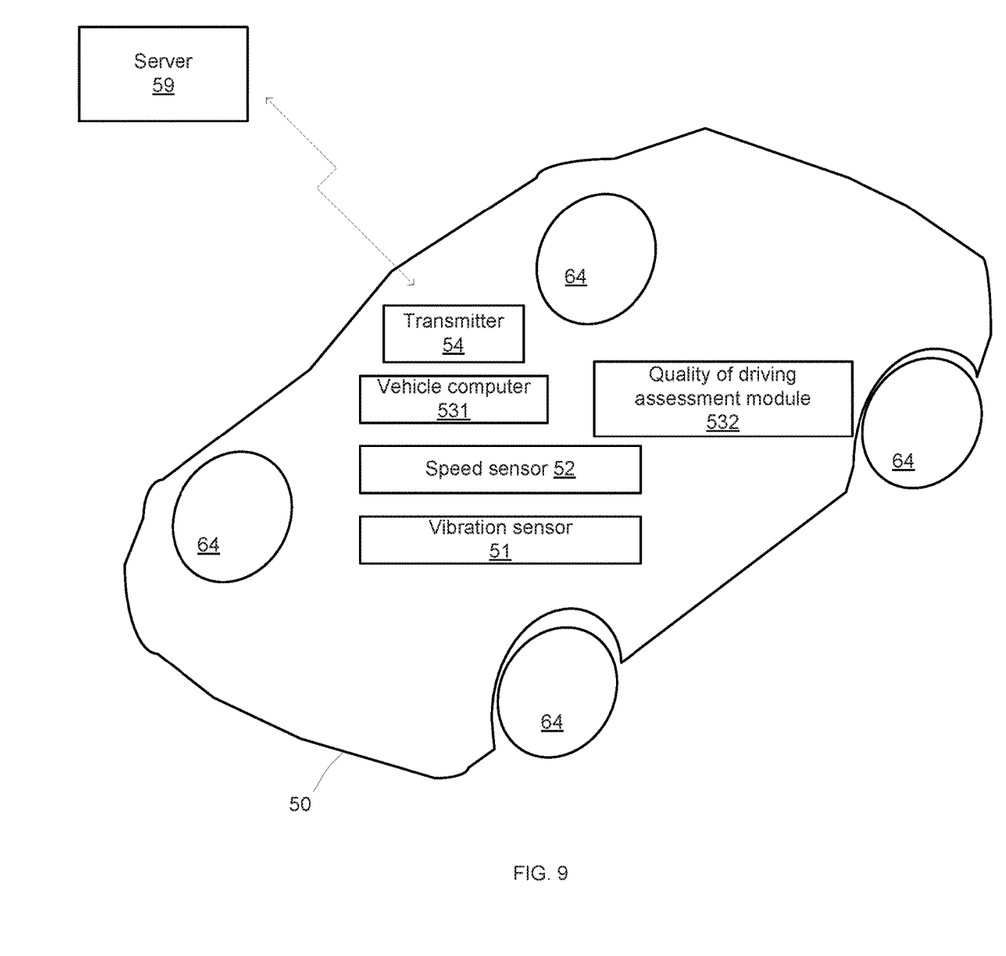
FIG. 9 illustrates a vehicle according to an embodiment of the invention.

The vehicle computer 53 may control the operations of various components of the vehicle, may execute any or some of the steps of any method illustrated in the application. It is noted that the vehicle computer may be replaced by a computer that controls various components of the vehicle and by another computer that calculates the quality of driving. FIG. 9 illustrates a quality of driving assessment module 532 which is computer that is configured to calculates the quality of driving (for example execute steps 16, 18 and 20) while the vehicle computer 531 controls the operations of various components of the vehicle—without executing the quality assessment.

Referring back to FIG. 5—vehicle computer 53 may include a processor 53(1) and memory unit 53(2). Processor 53(1) includes hardware components and may be a general purpose processor, an image processor, a hardware accelerator, an FPGA, an ASIC, and the like. Memory unit 53(2) may be a non-volatile memory.

The vibration sensor 51 may be mechanically coupled to a frame 65 of the car. The vibration sensor 51 may be connected to any part of the car—for example—it may be connected below and/or behind the dashboard of the car. The vibration sensor 51 may be positioned after the shock absorbers of the vehicle, before the shock absorbers or in any other position within the vehicle.

It is noted that vehicle 50 may include multiple vibration sensors and when using multiple vibrations sensors then steps 16, 18 and 20 may be responsive to the vibration measurements of these different vibration sensors.

Memory unit 53(1) may be is configured to (a) store vibrations measurements provided by at least one vibration sensor that is installed in a vehicle; (b) store speed measurements indicative of a speed of the vehicle.

Processor 53(2) may be configured to (a) determine, based on the vibration measurements and speed measurements, an actual relationship between speed and vibrations of the vehicle; (b) compare between the actual relationship between the speed and vibrations of the vehicle and a reference relationship between speed and vibrations of the vehicle to provide a comparison result; and determine a quality of the driving based on the comparison result.

Figure 6:
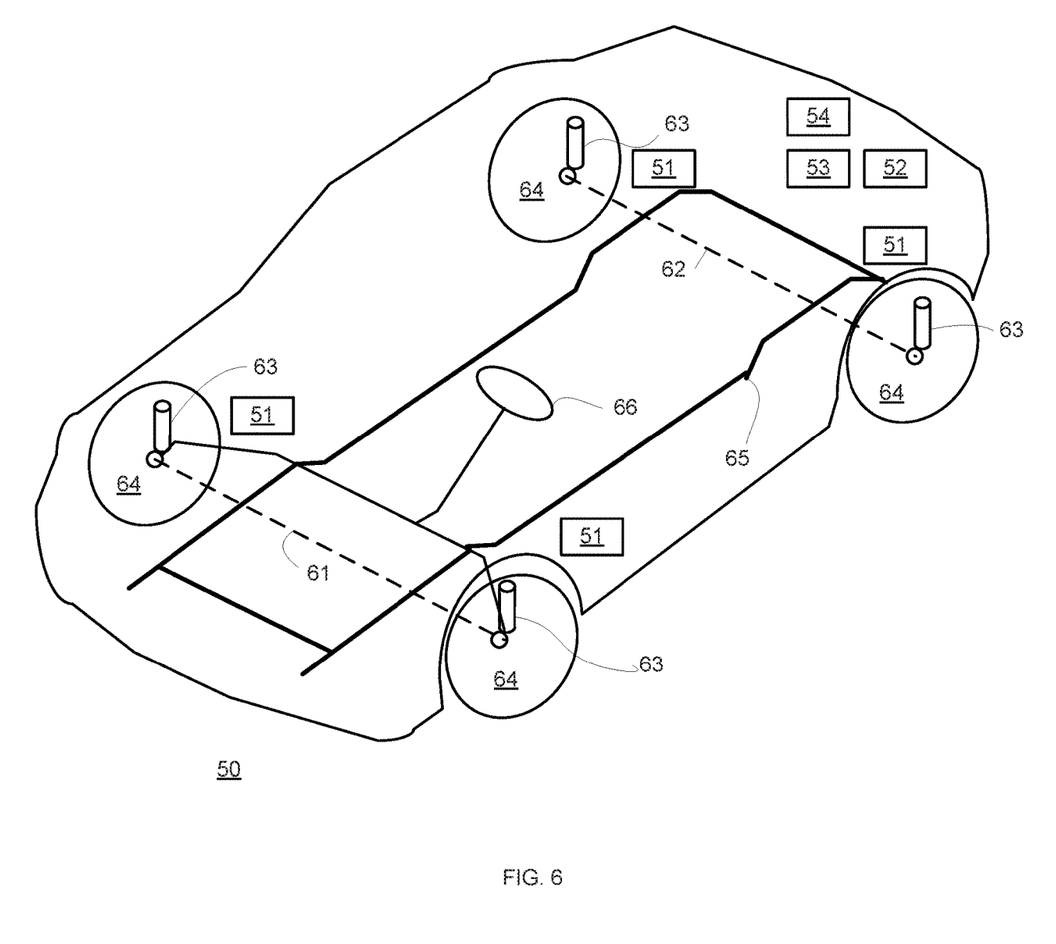
FIG. 6 illustrates a vehicle according to an embodiment of the invention.

FIG. 6 illustrates vehicle 50 according to an embodiment of the invention.

Vehicle 50 of FIG. 6 includes wheels 64, four vibration sensors 51—one vibration sensor per wheel, speed sensor 52, vehicle computer 53, transmitter 54, frame 65, front wheels axis 61, rear wheels axis 62, shock absorbers and wheels to frame interfaces 63, steering interface and drive wheel 66. The vibration sensors 51 may sense vibrations after the vibrations are partially damped by shock absorbers, may monitor the shock absorbers, may be coupled to any element of the suspension of the vehicle, and the like.

Figure 7:
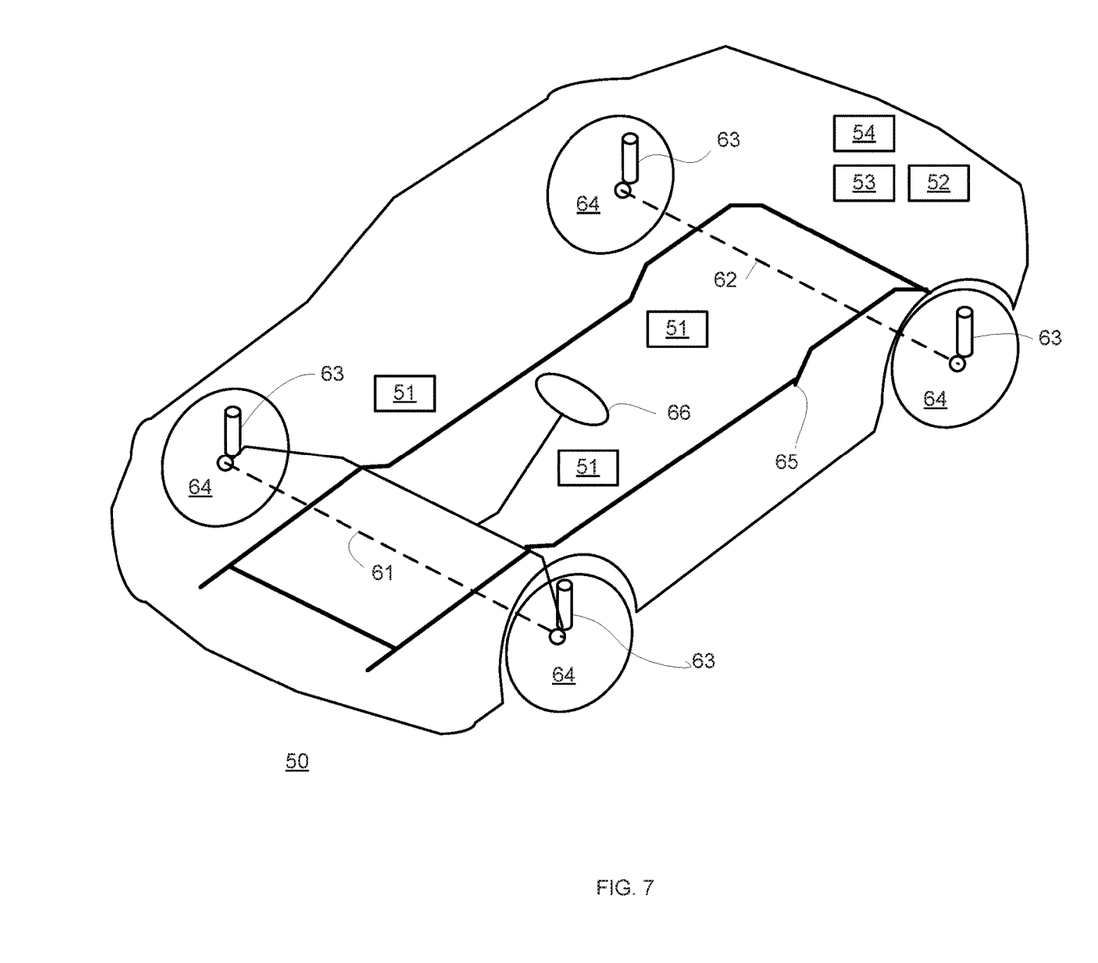
FIG. 7 illustrates a vehicle according to an embodiment of the invention.

FIG. 7 illustrates vehicle 50 according to an embodiment of the invention.

In FIG. 7 there are three vibration sensors 51 instead of four vibration sensors of FIG. 6. One vibration sensor is located at the center of the vehicle.

Figure 8:
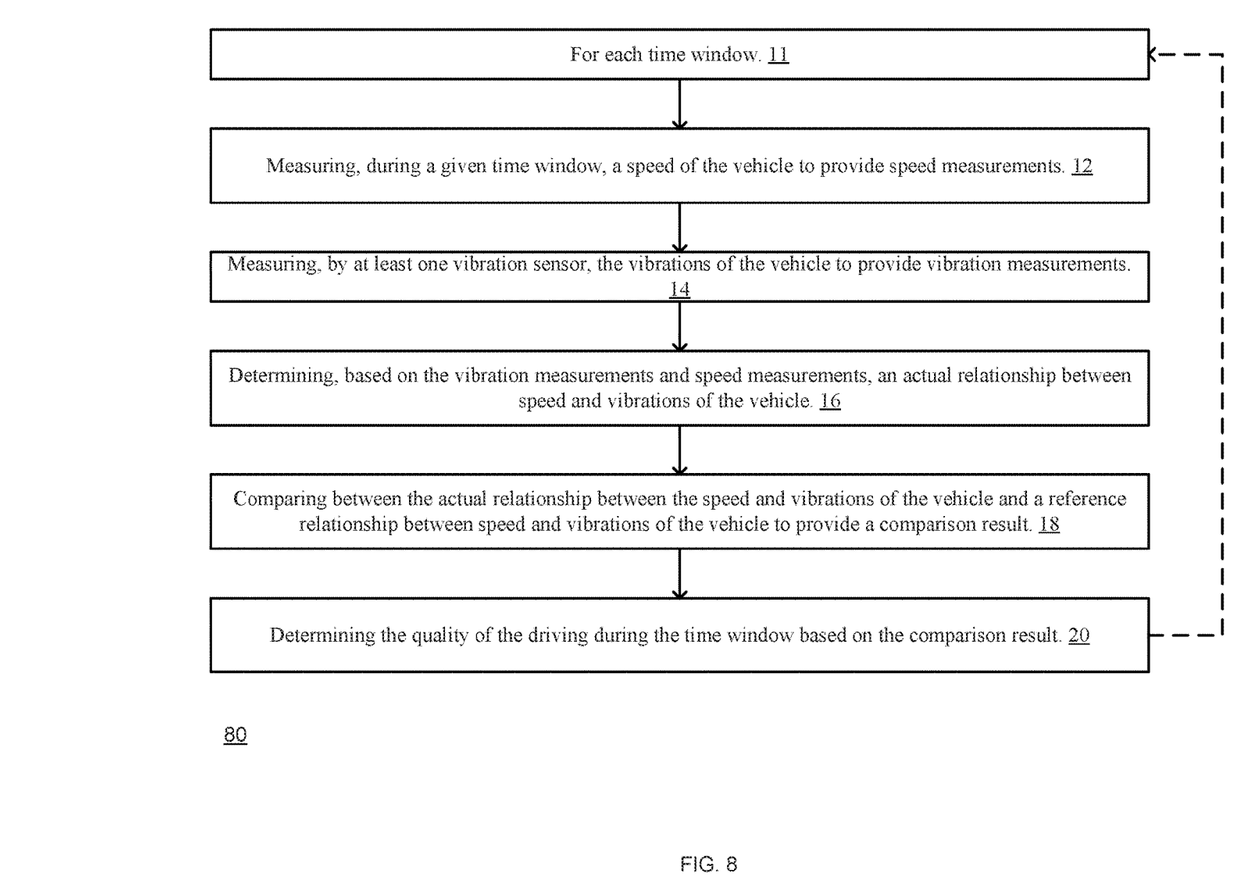
FIG. 8 illustrates a method according to an embodiment of the invention.

FIG. 8 illustrates method 80 according to an embodiment of the invention.

Method 80 differs from method 10 by not measuring the location of the vehicle.

Accordingly, step 12 of method 80 includes measuring the speed of the vehicle to provide multiple speed measurements.

The invention may be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices. Alternatively, the computer system may be implemented by a FPGA.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for monitoring a vehicle, the method comprising:
   measuring, by a speed sensor that is installed in the vehicle and while the vehicle is driven by a driver, a speed of the vehicle to provide speed measurements;
   measuring, by multiple vibration sensors that are installed in the vehicle and while the vehicle is driven by the driver, vibrations of the vehicle to provide vibrations measurements;
   determining, by a computer that is installed in the vehicle, based on the vibration measurements and speed measurements, an actual relationship between speed and vibrations of the vehicle;
   comparing, by the computer, between the actual relationship between the speed and vibrations of the vehicle and a reference relationship between speed and vibrations of the vehicle to provide a comparison result;
   determining, by the computer, a quality of the driving of the vehicle by the driver, based on the comparison result; and
   increasing the rate of the vibration measurements when sensing that the vehicle is about to cross an obstacle.

2. The method according to claim 1 comprising sensing that the vehicle is about to cross the obstacle by another sensor that differs from an accelerometer.

3. A method for monitoring a vehicle, the method comprising:
   measuring, by a speed sensor that is installed in the vehicle and while the vehicle is driven by a driver, a speed of the vehicle to provide speed measurements;
   measuring, by multiple vibration sensors that are installed in the vehicle and while the vehicle is driven by the driver, vibrations of the vehicle to provide vibrations measurements;
   determining, by a computer that is installed in the vehicle, based on the vibration measurements and speed measurements, an actual relationship between speed and vibrations of the vehicle;
   comparing, by the computer, between the actual relationship between the speed and vibrations of the vehicle and a reference relationship between speed and vibrations of the vehicle to provide a comparison result;
   determining, by the computer, a quality of the driving of the vehicle by the driver, based on the comparison result; and
   increasing a rate of the vibration measurements when sensing that the vehicle crosses an obstacle.

* * * * *